(12) United States Patent
Sukegawa

(10) Patent No.: US 11,880,025 B2
(45) Date of Patent: Jan. 23, 2024

(54) OPTICAL SYSTEM AND PLANE SPECTROSCOPIC DEVICE

(71) Applicant: CANON KABUSHIKI KAISHA, Tokyo (JP)

(72) Inventor: Takashi Sukegawa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/547,023

(22) Filed: Dec. 9, 2021

(65) Prior Publication Data
US 2022/0196997 A1    Jun. 23, 2022

(30) Foreign Application Priority Data
Dec. 17, 2020    (JP) .............................. JP2020-209578

(51) Int. Cl.
| | |
|---|---|
| *G02B 17/06* | (2006.01) |
| *G01N 21/35* | (2014.01) |
| *G02B 27/14* | (2006.01) |

(52) U.S. Cl.
CPC ......... *G02B 17/0652* (2013.01); *G01N 21/35* (2013.01); *G02B 27/14* (2013.01); *G01N 2201/0636* (2013.01)

(58) Field of Classification Search
CPC .. G02B 17/0652; G02B 27/14; G02B 27/143; G02B 27/1013; G01N 21/35;
(Continued)

(56) References Cited

U.S. PATENT DOCUMENTS

| | | | |
|---|---|---|---|
| 2004/0057049 A1* | 3/2004 | Bruch | ................... G01J 3/0256 356/334 |
| 2006/0072109 A1 | 4/2006 | Bodkin | |

(Continued)

FOREIGN PATENT DOCUMENTS

JP    2012237647 A    12/2012

OTHER PUBLICATIONS

Hagen, Nathan, et al. "Review of snapshot spectral imaging technologies." Optical Engineering, Sep. 23, 2013. pp. 090901-1 to 090901-23, vol. 52, No. 9, XP055915445, Bellingham, WA, United States, doi.org/10.1117/1.OE.52.9.090901.

(Continued)

*Primary Examiner* — Marcus H Taningco
(74) *Attorney, Agent, or Firm* — Canon U.S.A., Inc. I.P. Division

(57) ABSTRACT

An optical system to divide a light flux from an object plane includes a first curved-surface mirror, and second, third, and fourth reflecting portions. The second reflecting portion divides and reflects light flux from the first curved-surface mirror to respective different positions on the first curved-surface mirror as first light fluxes. The third reflecting portion reflects, as third light fluxes, the first light fluxes. The fourth reflecting portion reflects the third light fluxes from the third reflecting portion. A number of reflective surfaces of each of the third and fourth reflecting portions on which the first and third light fluxes are incident is the same as a division number in the dividing of the light flux into second light fluxes. The first and third light fluxes are reflected by the respective third and fourth reflecting portions to be image-formed so that divided images of the object plane are formed.

16 Claims, 7 Drawing Sheets

(58) Field of Classification Search
CPC ............ G01N 2201/0636; G01J 3/0243; G01J 3/2803; G01J 3/021
See application file for complete search history.

(56) References Cited

U.S. PATENT DOCUMENTS

| | | | | |
|---|---|---|---|---|
| 2010/0053627 | A1* | 3/2010 | Shyu | G03F 7/70625 356/446 |
| 2013/0163091 | A1* | 6/2013 | Moffatt | G02B 27/123 359/639 |
| 2015/0369917 | A1* | 12/2015 | Bridges | G01S 7/4817 356/4.01 |
| 2016/0161334 | A1* | 6/2016 | Shibayama | G01J 3/0262 356/402 |

OTHER PUBLICATIONS

Content, Robert. "Image slicer for integral field spectroscopy with NGST." Proceedings of SPIE, Aug. 28, 1998, pp. 122-133, vol. 3356, XP055914169, Space Telescopes and Instruments V, Kona, HI, United States. doi.org/10.1117/12.324521.

Ding, Xiaoming, et al. "Modeling and Optimization of Image Mapper for Snapshot Image Mapping Spectrometer." IEEE Access, May 8, 2018, pp. 29344-29352, vol. 6, IEEE, Manhattan, NY, United States, doi.org/10.1109/ACCESS.2018.2834485.

* cited by examiner

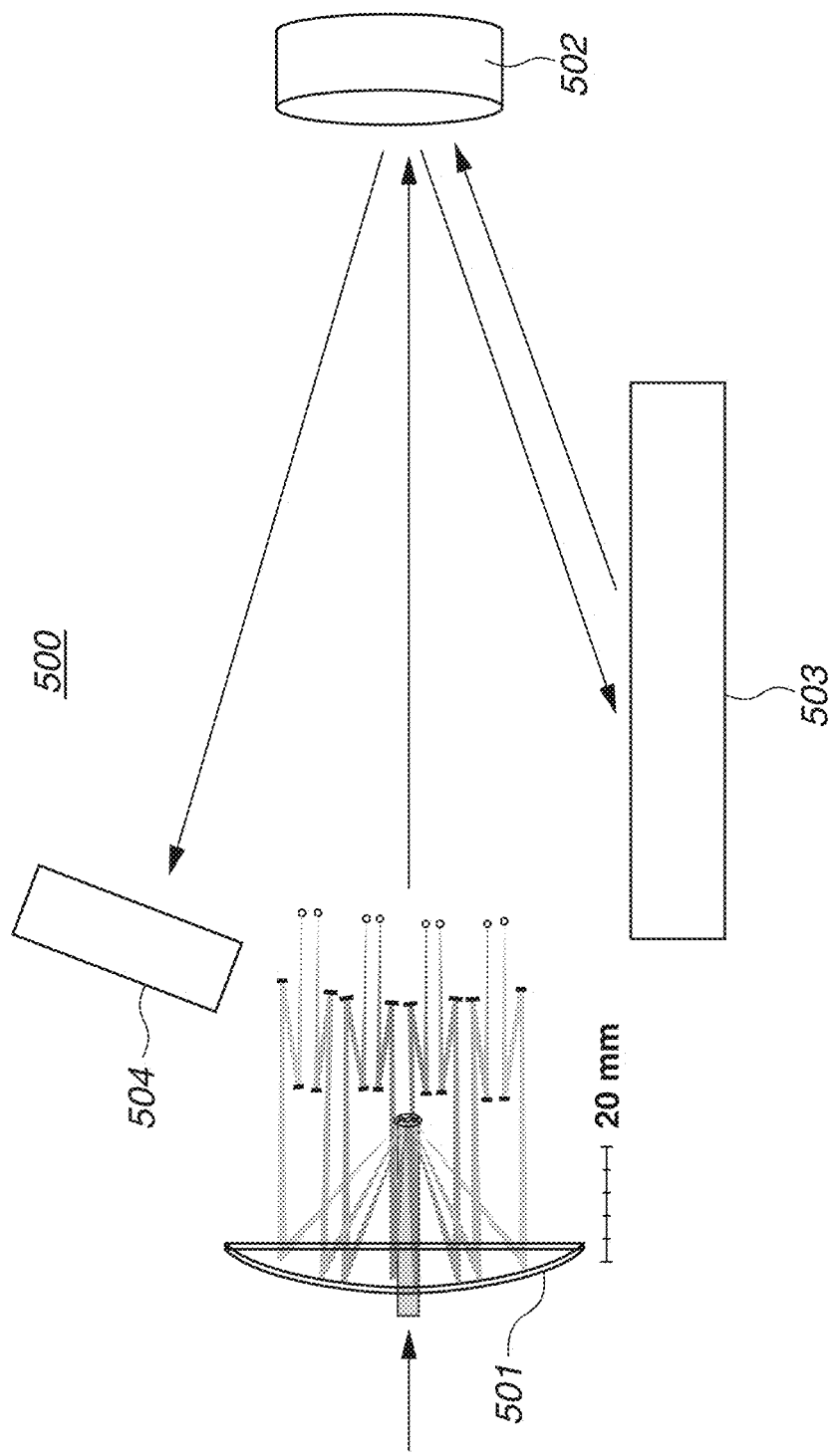

OPTICAL SYSTEM AND PLANE SPECTROSCOPIC DEVICE

BACKGROUND

Field

The present exemplary embodiments relate to an optical system and a plane spectroscopic device.

Description of the Related Art

When a dynamic phenomenon is analyzed in detail, it is highly useful to obtain information about wavelength (energy) by simultaneously and temporally performing spectral dispersion on images, and it is important in all fields involving chemical reactions. To simultaneously perform spectral dispersion on image information, which is two-dimensional, it is necessary to convert a two-dimensional image into a one-dimensional image because a general detector supports two-dimensional or less dimensional images and thus the number of dimensions into which wavelength information is expanded increases. Thus, a plane division optical system is an important element in plane spectral division which is collectively performed at substantially the same timing (Japanese Patent Application Laid-Open No. 2012-237647).

If an original image is more finely divided, higher-resolution information is obtainable, but it is not easy to one-dimensionally array divided images in a limited space. Most conveniently, one of means is to spread a large number of optical fibers all over an image portion and to one-dimensionally rearrange the optical fibers by utilizing their flexibility, which is a highly excellent method by which a higher resolution is achieved through an increase of fine optical fibers. However, the transmittance of the optical fiber is not completely uniform, and it is difficult to extract original light information in a uniform state, due to, for example, a polarization state of light changes because of a curvature. An optical fiber generally includes a core portion through which light passes and a clad portion that causes total reflection, and has an optimum size depending on a wavelength to be transmitted. Thus, there is no optical fiber optimum for a wide wavelength, and it is difficult in principle to efficiently perform plane spectral dispersion in a wide wavelength band. To address this, a method is available in which an image is spatially divided by a plurality of mirrors and the resultant image is one-dimensionally rearranged. There is a slight change in light characteristics due to reflection characteristics of the mirrors, but it is stable and it is easy to restore information. However, even if the divisional number is set to about several tens in consideration of manufacturing process, such as adjustment, because it is necessary to extremely accurately arrange the respective mirrors in terms of position and accuracy, the structure becomes spatially large, resulting in a difficulty in incorporating the mirrors into general equipment with an equivalent number of divisions. The plane division optical system is also effective in a case where an image is observed by a one-dimensional detector that is inexpensive and is capable of performing readout with high resolution at a high speed without using a two-dimensional detector.

SUMMARY

According to an aspect of the present disclosure, an optical system to divide a light flux from an object plane includes a first curved-surface mirror having an opening through which the light flux from the object plane passes or a transmitting portion through which the light flux is transmitted, a second reflecting portion including a plurality of reflective surfaces configured to divide the light flux from the opening or the transmitting portion of the first curved-surface mirror to result in second light fluxes, wherein the second reflecting portion is configured to guide each of the second light fluxes to respective positions, different from one another, on the first curved-surface mirror as first light fluxes, a third reflecting portion having a plurality of reflective surfaces, each of which reflects, as third light fluxes, first light fluxes that have been reflected on the first curved-surface mirror, and a fourth reflecting portion having a plurality of reflective surfaces configured to reflect the third light fluxes from the third reflecting portion, wherein a number of reflective surfaces of each of the third reflecting portion and the fourth reflecting portion on which the respective first and third light fluxes are incident is the same as a division number in the dividing of the light flux into the second light fluxes by the second reflecting portion, and wherein the first and third light fluxes are reflected by the respective third and fourth reflecting portions to be image-formed so that divided images of the object plane are formed.

Further features of the present disclosure will become apparent from the following description of exemplary embodiments with reference to the attached drawings.

BRIEF DESCRIPTION OF THE DRAWINGS

FIG. 7 is a schematic view of a plane spectroscopic device.

DESCRIPTION OF THE EMBODIMENTS

Hereinafter, preferred exemplary embodiments of the present disclosure will be described in detail with reference to the accompanying drawings.

Figure 1:
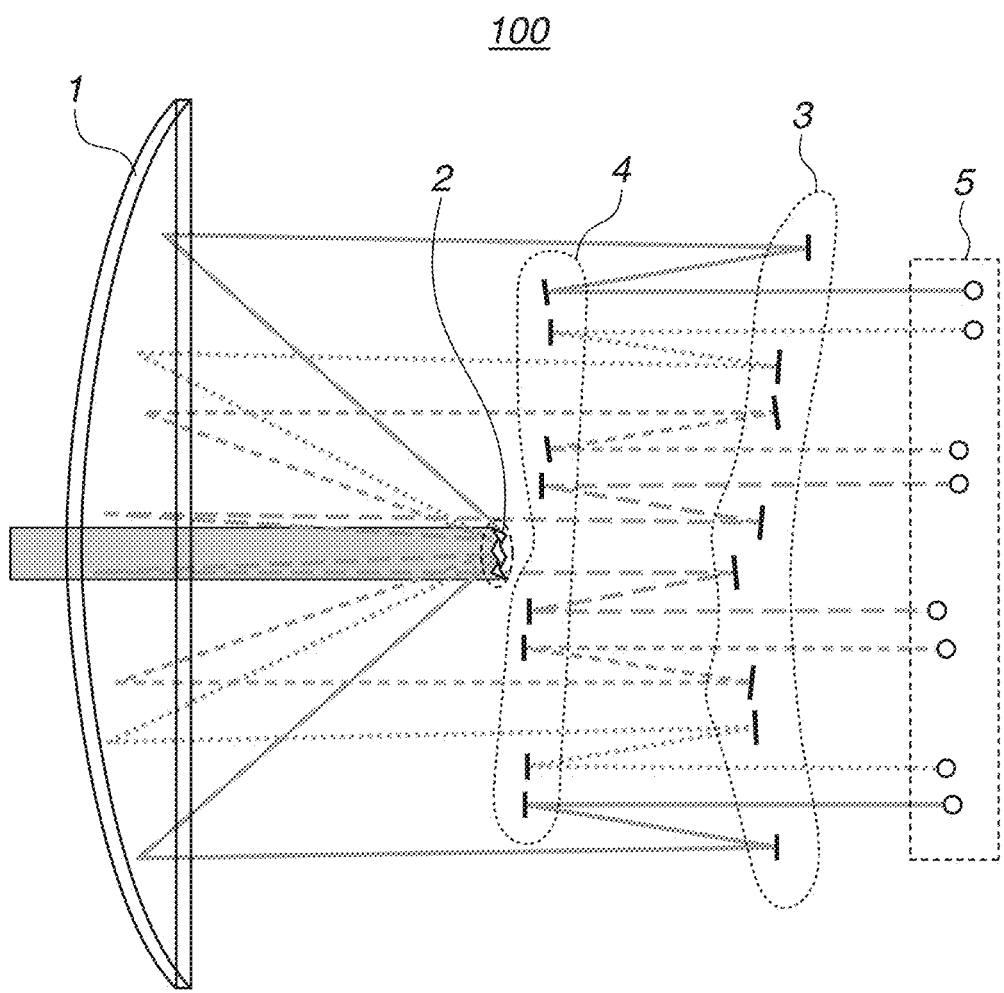
FIG. 1 is a view illustrating an optical system of a first exemplary embodiment.

A first exemplary embodiment of the present disclosure will be described below. FIG. 1 illustrates a view of a field division optical system 100 of the first exemplary embodiment. The field division optical system 100 is an optical system that divides a light flux from a side of an object plane. As illustrated in FIG. 1, the field division optical system 100 roughly includes four groups of mirrors in order from an incident direction of an incident light flux to be divided. The field division optical system 100 includes a first reflecting portion 1, a second reflecting portion 2, a third reflecting portion 3, and a fourth reflecting portion 4.

The first reflecting portion 1 is a curved-surface mirror having a curved reflective surface, and is provided with an opening through which the light flux from the object plane passes or a transmitting portion 1a through which the light flux is transmitted. For example, the opening is a cavity, and the transmitting portion 1a is formed of a transparent optical member. The first reflecting portion 1 is, for example, a rotationally symmetric concave mirror.

The second reflecting portion 2 has a plurality of reflective surfaces (mirrors) 2a that reflects the light flux through the opening or the transmitting portion 1a of the first reflecting portion 1 in directions different from one another depending on positions. In other words, the reflective surfaces 2a divide incident light into light fluxes by reflecting the incident light to positions different from one another on the reflective surface of the first reflecting portion 1. The reflective surfaces of the second reflecting portion 2 are each a mirror having a rectangular outer shape and arranged without a gap on a plane on which the incident light forms an image.

Figure 2A:
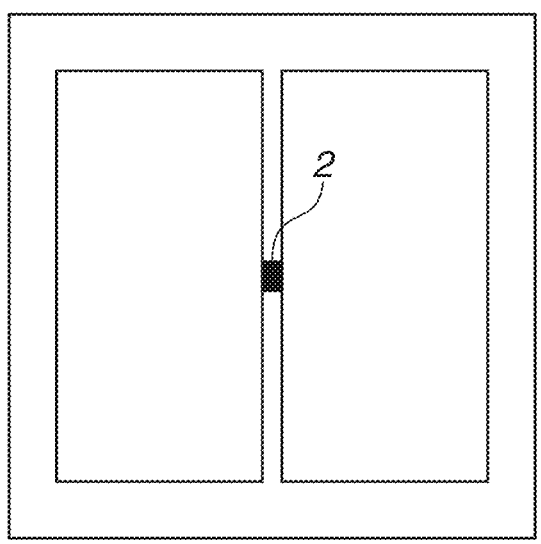
FIGS. 2A to 2C are views each illustrating a configuration of a second reflecting portion.
Figure 2B:
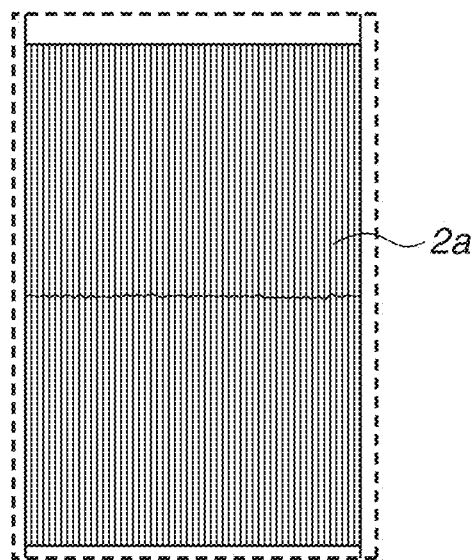
Figure 2C:
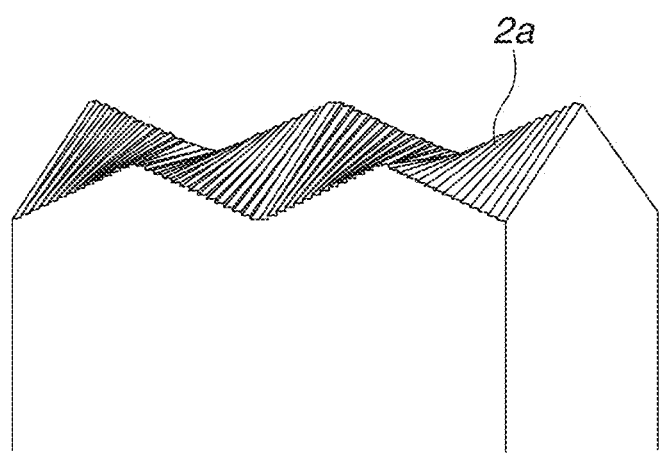

FIGS. 2A to 2C each illustrate a configuration of the second reflecting portion. As illustrated in FIG. 2A, the second reflecting portion 2 is supported by a support frame. FIG. 2B is a front view of the second reflecting portion 2, and the plurality of reflective surfaces 2a is integrated as viewed from the front. FIG. 2C is a view of the second reflecting portion 2 as viewed obliquely, and the respective surfaces of the plurality of reflective surfaces 2a face different directions from one another.

Figure 3:
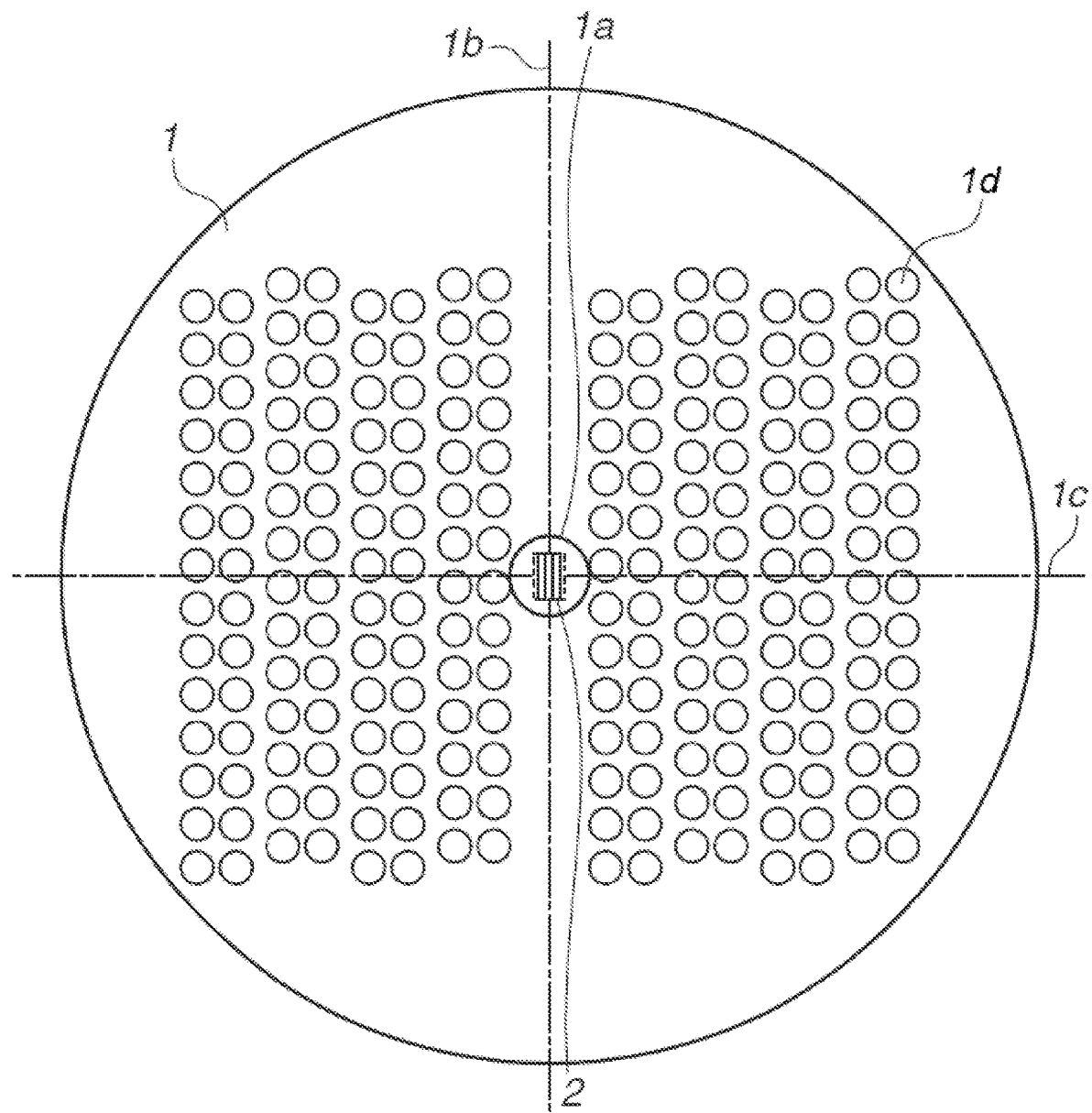
FIG. 3 is a view of the optical system according to the first exemplary embodiment as viewed from a side of a first reflecting portion.

The incident light fluxes to be divided are all reflected in different directions by the respective reflective surfaces 2a of the second reflecting portion 2, and are then reflected by the first reflecting portion 1. At this time, since each rectangular reflective surface 2a isotropically distributes the divided light, the isotropically divided reflected light impinges on the reflective surface of the first reflecting portion 1, as illustrated in FIG. 3. In the first reflecting portion 1, light impinges at positions 1d indicated by circles in FIG. 3. In other words, the light fluxes resulting from the division by the second reflecting portion 2 are incident on each region into which the reflective surface of the first reflecting portion 1 are divided by two axes 1b and 1c perpendicular to a rotational symmetry axis of the first reflecting portion 1.

The second reflecting portion 2 is arranged so that the center thereof is located on an optical axis passing through the opening or the transmitting portion 1a of the first reflecting portion 1. A plurality of mirrors (reflective surfaces) of the third reflecting portion 3 and the fourth reflecting portion 4 are arranged around a central axis with the optical axis of the first reflecting portion 1 serving as the central axis. In other words, the central axes of the first reflecting portion 1, the second reflecting portion 2, the third reflecting portion 3, and the fourth reflecting portion 4 are coaxially arranged. With such a configuration of the optical system 100, it is possible to spatially utilize an isotropic space with the incident light flux as the axis, and to achieve downsizing.

The third reflecting portion 3 is a mirror group including a plurality of mirrors (reflective surfaces) 3a, and reflects the light reflected by the second reflecting portion 2 and the first reflecting portion 1. The number of mirrors 3a of the third reflecting portion 3 on which the light from the first reflecting portion 1 is incident is the same as the number of divisions of the light fluxes by the second reflecting portion 2.

The fourth reflecting portion 4 is a mirror group including a plurality of mirrors (reflective surfaces) 4a, and reflects the light from the third reflecting portion 3. The number of mirrors 4a of the fourth reflecting portion 4 on which the light from the first reflecting portion 1 is incident is the same as the number of mirrors 3a of the third reflecting portion 3. Each mirror 4a of the fourth reflecting portion 4 is a curved-surface mirror. Images that are condensed and one-dimensionally (linearly) arrayed by the mirrors 4a of the fourth reflecting portion 4 are formed in an image-reforming area. In other words, the light fluxes reflected by the first reflecting portion 1 are reflected by the third reflecting portion 3 and the fourth reflecting portion 4 to be image formed, so that divided images of the object plane is formed at an image-reforming position 5 of a predetermined plane.

Each of the mirrors of the third reflecting portion 3 has a flat surface and each of the mirrors of the fourth reflecting portion 4 has a spherical surface, but may be reversed. In other words, either the plurality of mirrors of the third reflecting portion or the plurality of mirrors of the fourth reflecting portion has a flat surface and the other has a curved surface.

The mirrors of each of the second reflecting portion 2, the third reflecting portion 3, and the fourth reflecting portion 4 face different directions.

Figure 4:
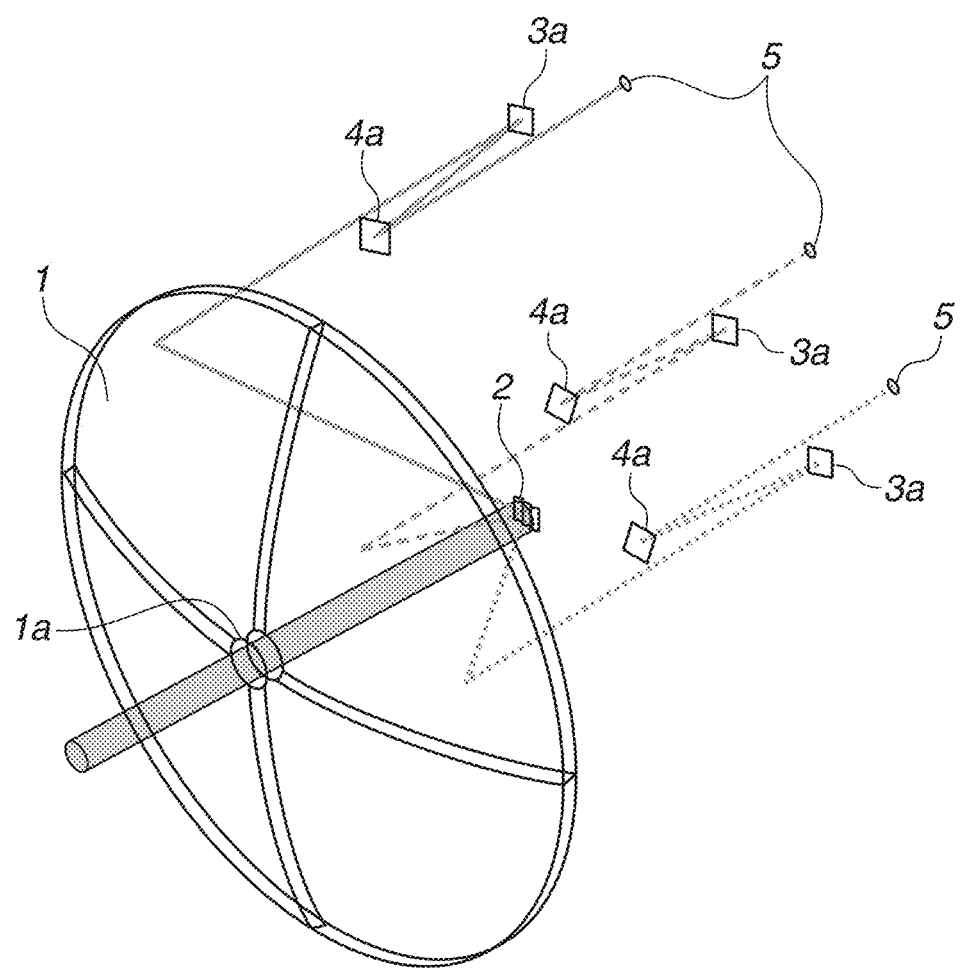
FIG. 4 is a bird's-eye view of the optical system according to the first exemplary embodiment.

FIG. 4 illustrates a bird's-eye view of the optical system 100, and illustrates optical paths reflected by the respective reflecting portions. The first reflecting portion 1 has an opening in a central portion, and the mirrors are arranged so that the light divided by the second reflecting portion 2 does not overlap the mirrors of each of the third reflecting portion 3 and the fourth reflecting portion 4. The second reflecting portion 2 is integrally molded so as to fill an image plane portion for the incident light.

Figure 5:
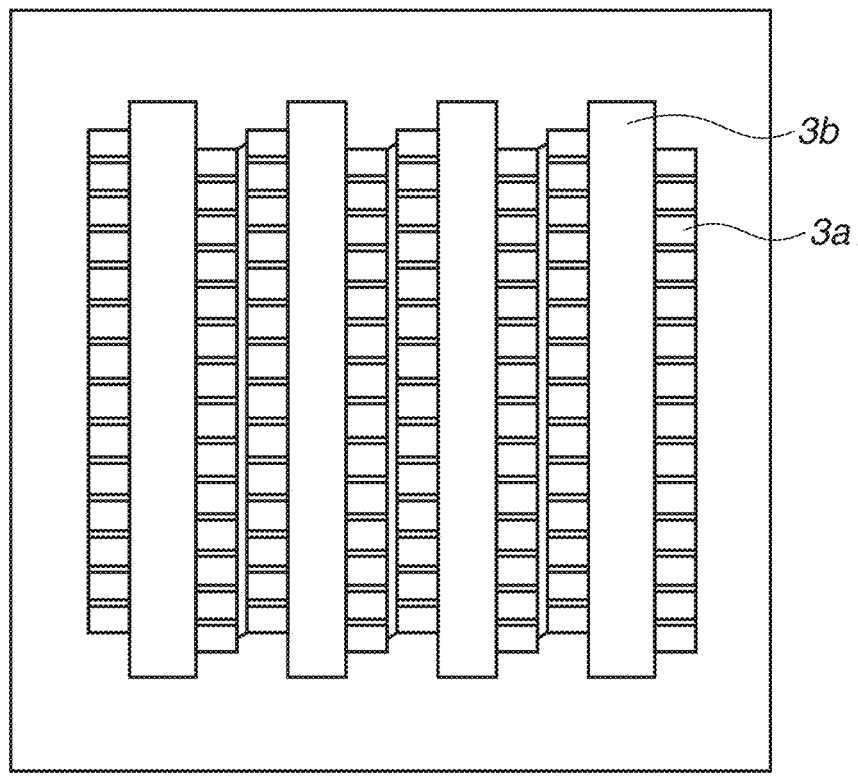
FIG. 5 is a view illustrating a configuration of a third reflecting portion.

FIG. 5 illustrates a configuration of the third reflecting portion. The mirrors 3a of the third reflecting portion 3 are each formed on a physically integrated structure, but an opening 3b is provided in a portion through which the light flux passes. Similarly, the mirrors 4a of the fourth reflecting portion 4 is formed on a physically integrated structure, but an opening is provided in a portion through which the light flux passes.

The first reflecting portion 1, the second reflecting portion 2, the third reflecting portion 3, and the fourth reflecting portion 4 have an isotropic structure centered on the incident light flux axis, and the plane spectroscopic optical system can be easily assembled, without any adjusting mechanism, by simply arranging these reflecting portions at desired intervals.

As is clear from the light flux flight cross-sectional view of FIG. 1, the images are rearrayed using a space as densely as possible, and a flight distance in the space and the mirror configuration are also controlled, thus achieving downsizing and highly efficient plane division while providing high resolution.

Figure 6:
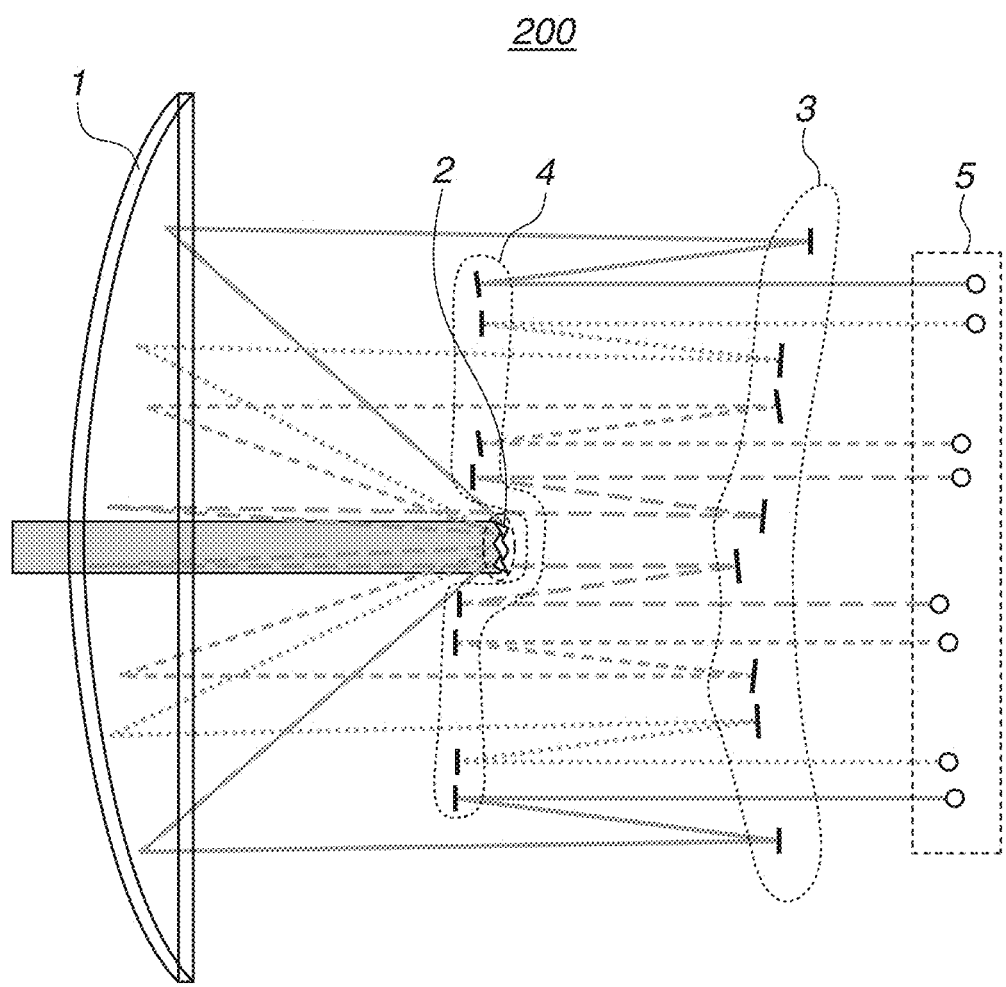
FIG. 6 is a view illustrating an optical system according to a second exemplary embodiment.

A second exemplary embodiment of the present disclosure will be described below. In the present exemplary embodiment, relative positions of a second reflecting portion 2 and a fourth reflecting portion 4 are different from those in the first exemplary embodiment. FIG. 6 illustrates an optical system 200 according to the present exemplary embodiment. As illustrated in FIG. 6, the fourth reflecting portion 4 is arranged forward of the second reflecting portion 2 (the side closer to a first reflecting portion). As a result, the fourth reflecting portion 4 is arranged in the vicinity of the front and rear of the second reflecting portion 2, and thus, the second reflecting portion 2 and the fourth reflecting portion 4 can be formed on an integrated structure.

Next, a plane spectroscopic device using the optical system according to an above-described exemplary embodiment will be described.

FIG. 7 illustrates a schematic view of a plane spectroscopic device 500. The plane spectroscopic device 500 causes a light flux that is to be spectrally dispersed to be incident on an optical system 501 according to an above-described exemplary embodiment, one-dimensionally rearrays the light flux through plane division, and then performs the plane spectrum dispersion via an image-forming mirror 502, a spectroscopic element 503, and a detection unit 504. The light to be spectrally dispersed is, for example, infrared light.

In the plane spectroscopic device 500, the light flux is reflected from the plane division optical system 501 to the spectroscopic element 503, which is, for example, a diffraction grating, using the image-forming mirror 502 which is an off-axis paraboloid mirror. The light flux spectrally dispersed by the spectroscopic element 503 and spread on the plane is incident on the paraboloid mirror again by diffraction, and forms an image on the detection unit 504 having a two-dimensional detector. Thus, a result of a spectrally dispersed image plane can be obtained.

To obtain an original image for each wavelength, it is possible to obtain a spectral image in an original-image form by rearraying a one-dimensional image of a desired wavelength on the two-dimensional detector in accordance with a division rule.

Although the preferred exemplary embodiments of the present disclosure have been described above, the present disclosure is not limited to these exemplary embodiments, and various modifications and changes can be made within the scope of the gist of the present disclosure.

According to the above exemplary embodiments, a plane spectroscopic device that is advantageous in downsizing, high resolution, or high efficiency can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-209578, filed Dec. 17, 2020, which is hereby incorporated by reference herein in its entirety.

What is claimed is:

1. An optical system to divide a light flux, the optical system comprising:
    a first reflecting portion having a reflective surface;
    a second reflecting portion including a plurality of second reflective surfaces configured to divide the light flux, wherein the second reflecting portion is configured to guide each of the light fluxes divided by the plurality of second reflective surfaces to respective positions, different from one another, on the first reflecting portion; and
    an optical portion configured to perform image formation with each of the light fluxes divided by the second reflecting portion and reflected by the first reflecting portion so that images equal in number to a division number in the dividing of the light flux by the second reflecting portion are formed,
    wherein the images equal in number to the division number formed by the image formation include images of a first group which are linearly arranged and images of a second group which are linearly arranged in another line different from a line in which the images of the first group are linearly arranged.

2. The optical system according to claim 1, wherein the first reflecting portion has a curved-surface mirror.

3. The optical system according to claim 2,
    wherein the curved-surface mirror has a rotationally symmetric mirror, and
    wherein the light fluxes divided by the second reflecting portion are incident on respective regions divided by two axes perpendicular to a rotational symmetry axis of the rotationally symmetric mirror.

4. The optical system according to claim 2, wherein the curved-surface mirror has an opening configured to pass the light flux through the opening or a transmitting portion configured to transmit the light flux through the transmitting portion.

5. The optical system according to claim 1, wherein the optical portion includes a third reflecting portion having a plurality of third reflective surfaces configured to reflect the light fluxes that have been reflected on the first reflecting portion.

6. The optical system according to claim 5, wherein the third reflecting portion integrally forms each reflective surface.

7. The optical system according to claim 5, wherein the plurality of third reflective surfaces of the third reflecting portion includes a reflective surface configured to reflect light fluxes for forming the images of the first group and a reflective surface configured to reflect light fluxes for forming the images of the second group.

8. The optical system according to claim 5, wherein the optical portion includes a fourth reflecting portion having a plurality of fourth reflective surfaces configured to reflect light fluxes from the third reflecting portion.

9. The optical system according to claim 8, wherein the fourth reflecting portion integrally forms each reflective surface.

10. The optical system according to claim 8, wherein the plurality of fourth reflective surfaces of the fourth reflecting portion includes a reflective surface configured to reflect light fluxes for forming the images of the first group and a reflective surface configured to reflect light fluxes for forming the images of the second group.

11. The optical system according to claim 8, wherein the third reflecting portion includes an opening configured to pass light flux from the fourth reflecting portion through the opening.

12. The optical system according to claim 8, wherein the fourth reflecting portion includes an opening configured to pass light flux from the first reflecting portion through the opening.

13. The optical system according to claim 8, wherein central axes of a rotationally symmetric concave mirror, the second reflecting portion, the plurality of third reflective surfaces of the third reflecting portion, and the plurality of fourth reflective surfaces of the fourth reflecting portion are coaxially arranged.

14. The optical system according to claim 8, wherein one of the plurality of third reflective surfaces of the third reflecting portion and the plurality of fourth reflective surfaces of the fourth reflecting portion is a flat surface, and the other of the plurality of third reflective surfaces of the third reflecting portion and the plurality of fourth reflective surfaces of the fourth reflecting portion is a curved surface.

15. The optical system according to claim 8, wherein a number of reflective surfaces of each of the third reflecting portion and the fourth reflecting portion on which the light fluxes are incident is the same as the division number in the dividing of the light flux by the second reflecting portion.

16. A plane spectroscopic device comprising:
    the optical system according to claim 1;

a spectroscopic element configured to spectrally disperse light from the optical system; and a detection unit configured to detect the light spectrally dispersed by the spectroscopic element.

* * * * *